April 28, 1942. B. PRATT ET AL 2,281,381
RINGED SHAFT-MOUNTED PISTON
Filed Nov. 12, 1941 2 Sheets-Sheet 1
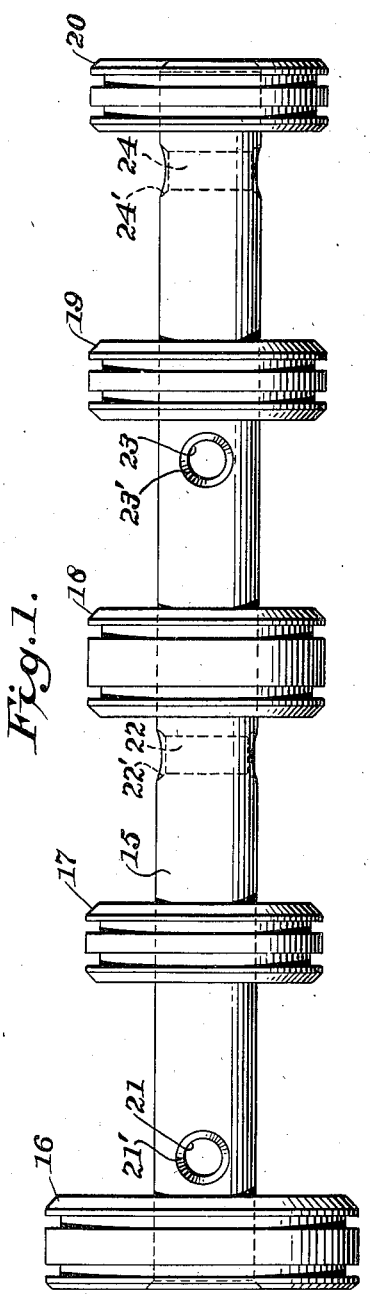
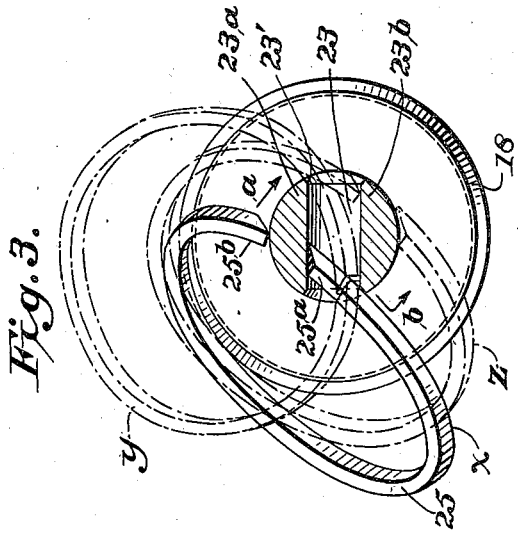
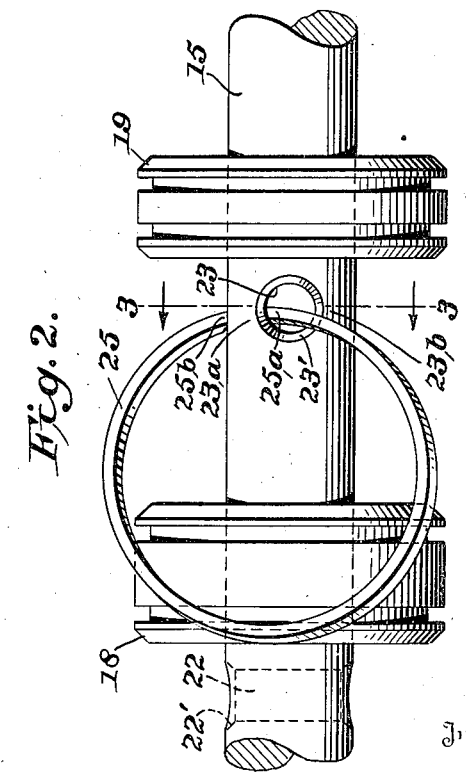
Inventors:
Best Pratt,
Clarence J. Smith,

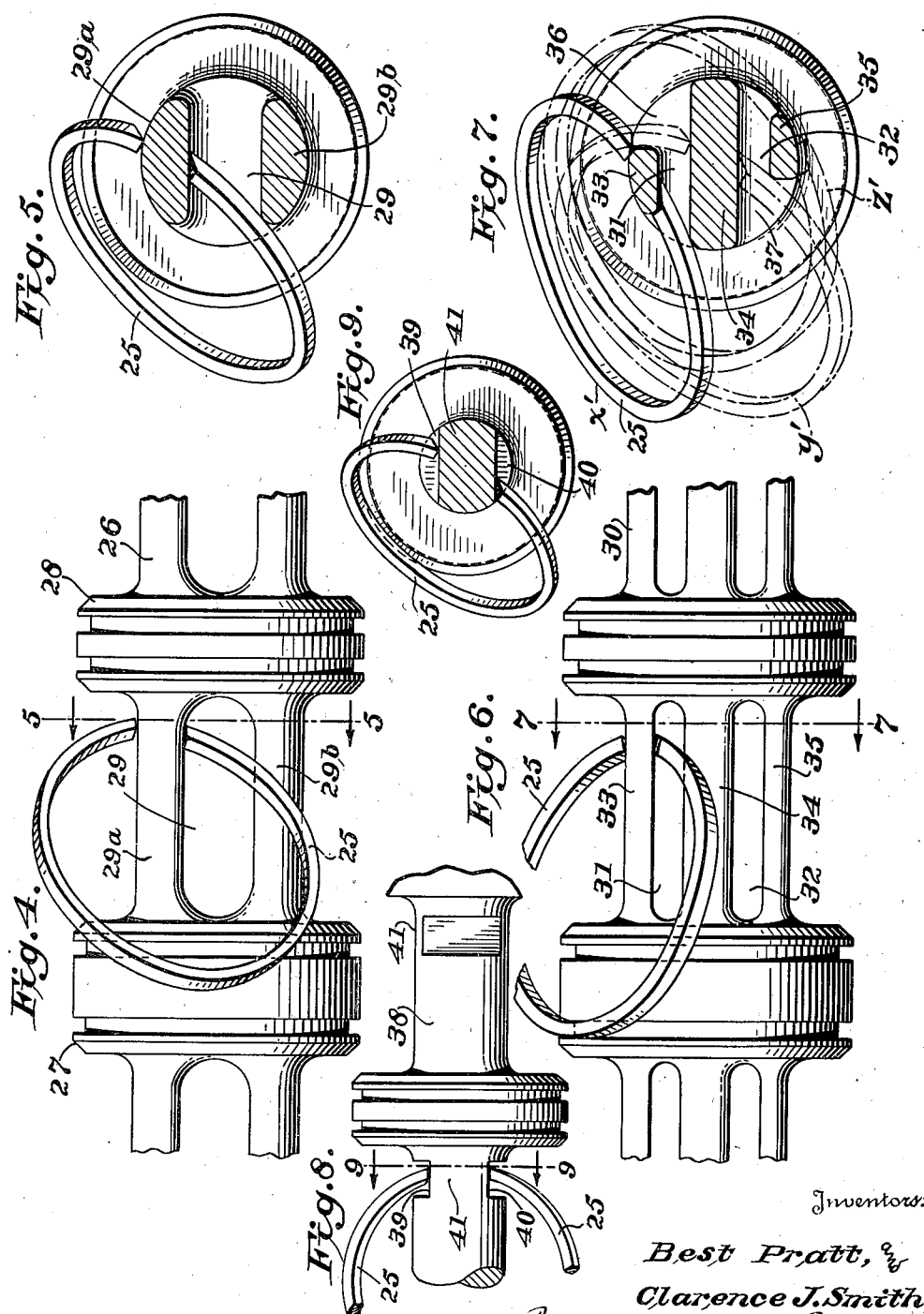

Patented Apr. 28, 1942

2,281,381

UNITED STATES PATENT OFFICE 2,281,381

RINGED SHAFT-MOUNTED PISTON

Best Pratt and Clarence J. Smith, Chicago, Ill., assignors to Brake Equipment & Supply Company, Chicago, Ill., a corporation of Illinois Application November 12, 1941, Serial No. 418,784

6 Claims. (Cl. 309—1)

This invention relates to improvements in shaft-mounted piston and piston ring assemblies and to a method of assembly whereby in situations heretofore presenting considerable difficulty, split piston rings can be easily and quickly applied to the piston without danger of breaking or permanently distorting the rings.

In the case of valve units, for example, involving multiple pistons fixed on a solid shaft, considerable difficulty has heretofore been experienced in applying the split rings to the grooves of such pistons as are not directly accessible from the ends of the shaft. Two courses have heretofore been possible in assembling rings with an intermediate piston, namely (1) to advance the rings up to the intermediate piston by springing them successively over intervening pistons between it and the shaft end, or (2) to spring the rings over the shaft adjacent the piston to which they are to be applied. The first course takes considerable time and patience and even then results in considerable breakage or permanent distortion of the rings, while in the second course the percentage of loss by breakage and permanent distortion is very high since in order to spring the rings over the shaft they are frequently spread beyond their elastic limit. It is the purpose of the present invention to provide means and method whereby these difficulties are overcome in a simple and effective manner. How this object may be achieved is shown by way of example in the accompanying drawings in which:

Figure 1 is an elevation of a single-shaft multiple piston unit with the shaft modified in accordance with the invention.

Figure 2 is an enlarged elevation of a portion of the unit of Figure 1 showing a split piston ring in the course of application.

Figure 3 is a section substantially on line 3—3 of Figure 2 showing also successive stages of ring application.

Figure 4 is a view like that of Figure 2, but showing a modified form of shaft.

Figure 5 is a section substantially on line 5—5 of Figure 4.

Figure 6 is a view like that of Figure 3, but showing a still further modified form of shaft.

Figure 7 is a section substantially on line 7—7 of Figure 6 showing, additionally, successive stages of ring application.

Figure 8 is a partial elevation showing another shaft form, and

Figure 9 is a section substantially on line 9—9 of Figure 8.

Referring to the drawings, and first to Figures 1 to 3, Figure 1 shows, by way of example, a multiple piston valve of air compressor type. This unit comprises a cylindrical shaft 15 to which are welded cylindrical pistons 16, 17, 18, 19 and 20, each of which, as here shown, is provided with two circumferential grooves for the reception of split piston rings. The pistons 17 to 20 are all of the same diameter, while the diameter of piston 16 is substantially greater. In view of the large diameter of piston 16 it is entirely impossible to advance therover a ring of the size required for piston 17. In accordance with prior practice, and as above discussed, rings for the latter piston are either (1) sprung successively over pistons 20, 19 and 18 in order to reach piston 17, or else (2) they are sprung over shaft 15 directly adjacent piston 17, with a high percentage of piston ring loss in either case.

According to the present invention, as applied in the embodiment of Figures 1 to 3, the shaft 15 is provided with diametrical bores 21, 22, 23 and 24, the bore 21 being adjacent piston 16 and bores 22 to 24 adjacent pistons 18 to 20 respectively. Each bore, as here shown, is perpendicular to the axial plane of the adjacent bore or bores and both ends of the bores are countersunk as at 21′, 22′, 23′ and 24′. The shaft portion at each bore is thus cross-sectionally reduced and comprises, as at the bore 23, Figure 3, two oblong sections 23a and 23b.

In Figures 2 and 3 it is assumed that a split ring 25 having for example a diagonal split, is to be applied, to the left hand groove of piston 18, Figure 2, or to the right hand groove of piston 19. The ring is laid against piston 18 as shown in Figure 2, and its end 25a is inserted in the bore 23 with the ring disposed so as to take advantage of the diagonal direction of the split. In the unstressed ring there is substantial clearance between the ring ends, but if greater clearance is required it can be obtained not only by circumferential expansion of the ring, but also by moving the ring ends oppositely from the normal plane of the ring. As shown in full lines in Figure 3, the end 25a of the ring can now be threaded through the bore 23 while the other end 25b of the ring moves over the outside of section 23a, in the direction of the arrow a, from postion x to position y to bring the ring into completely surrounding relation to section 23a. In this manipulation it will be seen that the ring ends move across the minor dimension of the oblong, which dimension is such that no undue spreading whatever of the ring is occasioned.

With the ring in the position $y$ its end 25a is moved in the direction of the arrow $b$, against the outside of section 23b and through position $z$ into completely surrounding relation to the shaft. The ring may now be directly sprung into a groove of either adjacent pistons. With a bore between each pair of pistons, as here shown, it will be evident that a ring can be directly applied to the immediately adjacent groove of one piston from one direction or to the immediately adjacent groove of the other piston from the other direction. Of course, both grooves of each piston can be approached from the same direction, the remote groove being reached by springing the ring over the land between the two grooves. By providing a shaft bore between each pair of pistons, however, the rings can be applied from both sides of a piston without the necessity of having to jump the first one of two grooves in order to reach the other.

As has been heretofore pointed out, bore 23, for example, is nearer piston 19 than to piston 18. This is so because the distance between the pistons is less than the diameter of the ring and by placing the bore nearer one piston than the other the ring can be made to lie more nearly parallel along the shaft during application than would otherwise be the case. Obviously, the flatter the disposition of the ring relative to the shaft during application the better its lateral spring can be taken advantage of so as to enable the required spread to be obtained with minimization of circumferential expansion.

The length and diameter of the bores should be such in relation to the curve and radial dimension of the ring that the ring will not bind in the bore when threaded therein. By countersinking the ends of the bores their main diameter can be less than would otherwise be possible.

Alternate bores are differently angled around the axis of the shaft in order not to weaken the latter throughout in a single transverse direction.

Typical dimensions, reproduced substantially to scale in Figures 2 and 3 and somewhat reduced in Figure 1, are as follows:

Shaft diameter approximately 1 inch, distance between pistons 18 and 19 approximately 2 inches outside diameter of the pistons 2.421 inches, diameter at the bottom of the grooves 2¹³⁄₆₄ inches, groove width 0.136 inch, and bore diameter ⅜ inch with 45° countersink ⅛ inch wide at each end. Outside diameter of cast iron ring 2.505 inches with joint closed, normal joint opening ⁷⁄₃₂ inch at 45° angle to plane of ring, radial thickness ³⁄₃₂ inch, and axial thickness 0.135 inch. With these typical proportions it is practically impossible to spring the ring past the full shaft diameter without exceeding the elastic limit of the ring, but by providing a reduced portion and manipulating the ring as described, the ring can be quickly applied and without any danger whatever of damaging them.

In Figures 1 to 3 the pistons are contemplated as being separately welded in position on the shaft. In Figures 4 and 5 the shaft 26 and pistons 27 and 28 are integrally cast together and instead of providing the shaft with cylindrical bores, it is provided with symmetrically disposed transverse slots 29 which extend substantially between adjacent faces of the pistons and provide the oblong sections 29a and 29b, as shown in Figure 5, the edges of the sections being rounded off or beveled to give the same effect as the countersinks of the first embodiment. The manner of manipulating the ring 25 is the same as previously described, the advantage of the slots over the bores being that during application the ring can be laid along the shaft in either direction. The shaft is shown as being of larger diameter than in the first embodiment and the slots are of increased width as over the diameters of the bores in order to render sections 29a and 29b adequately small.

In Figures 6 and 7 an integrally cast shaft and piston unit is again shown. In this case, however, the shaft 30 has an even greater diameter than in Figures 4 and 5 and between each pair of pistons is provided with two substantially parallel transversely extending slots 31 and 32 providing a reduced portion which comprises oblong sections 33, 34 and 35. The section 34 has in one direction the full diametrical dimension of the shaft and in order to minimize the necessary spread of the ring when being engaged over this section, the sections 33 and 35 are relieved at opposite edges to afford relatively large clearance spaces 36 and 37. In the position $x'$ of the ring 25, Figure 7, the ring occupies the position corresponding to position $x$ in Figure 3 and continued movement of the ring brings it into surrounding relation to section 33. Further manipulation, including the position $y'$, Figure 7, brings the ring into surrounding relation to both of sections 33 and 34 and the ring is then manipulated through the position $z'$ to bring it into surrounding relation to the whole shaft and it may then be sprung into a groove of either adjacent piston.

In Figures 8 and 9, portions of the shaft 38 adjacent the pistons are relieved on opposite sides only as at 39 and 40 to produce the parallel-walled oblong section 41 which appears in Figure 9, this section being symmetrical with respect to the shaft axis and its major dimension being the full diameter of the shaft. Alternate sections 41 are rectangularly related as shown in Figure 8. The manner of application of the ring to bring it around the shaft will be clear from Figure 9 in view of what has been said before in connection with the other forms. The difference is that in the embodiment of Figures 8 and 9 only a single operation is required to bring the ring into surrounding relation to the shaft, whereas in the embodiments of Figures 1, 2, 3, 4 and 5 two movements are necessary and in the embodiment of Figures 6 and 7, three operations are required. In each case the shaft is provided with one or more portions of reduced cross-sectional area, each portion comprising one or more sections which will separately pass a ring without harmful distortion thereof. Where a single transverse bore is provided it is preferably diametrical although this disposition may be departed from as desired.

It will be understood that the showing herein is illustrative and not restrictive of the invention and that variations may be made in details of form and arrangement of parts without departure from the scope of the invention as defined in the following claims.

We claim:

1. A shaft and a piston carried thereby, said piston having a peripheral groove for the reception of a split piston ring and said shaft having a diameter such that the ring cannot be spread sufficiently to pass said diameter without danger of breakage or permanent distortion, said shaft having a portion of reduced cross-section which will pass the ring without undue spreading of the ring.

2. A shaft and a piston carried thereby, said piston having a peripheral groove for the reception of a split piston ring and said shaft having a diameter such that the ring cannot be spread sufficiently to pass said diameter without danger of breakage or permanent distortion, said shaft having adjacent each side of said piston a portion of reduced cross-section which will pass the ring without undue spreading of the latter, each of said sections being oblong with the long dimention of each at a right angle to that of the other.

3. A shaft and a piston carried thereby, said piston having a peripheral groove for the reception of a split piston ring and said shaft having a diameter such that the ring cannot be spread sufficiently to pass said diameter without danger of breakage or permanent distortion, said shaft being relieved at opposite sides only to provide a reduced portion of oblong cross-section whose minor dimension will pass the ring without undue spreading.

4. A shaft and a piston carried thereby, said piston having a peripheral groove for the reception of a split piston ring and said shaft having a diameter such that the ring cannot be spread sufficiently to pass said diameter without danger of breakage or permanent distortion, said shaft having an opening therethrough so that a reduced portion comprising separate sections is provided and each of said sections is such as to separately pass the ring without undue spreading whereby to enable the ring to be brought into a position of complete encirclement of the shaft.

5. A shaft and a piston carried thereby, said piston having a peripheral groove for the reception of a split piston ring and said shaft having a diameter such that the ring cannot be spread sufficiently to pass said diameter without danger of breakage or permanent distortion, said shaft having a plurality of transverse openings therethrough transversely spaced apart and providing a reduced portion comprising a plurality of sections of which each will separately pass the ring without undue spreading to enable the ring to be brought into a position of complete encirclement of the shaft.

6. A shaft and a piston carried thereby, said piston having a peripheral groove for the reception of a split piston ring and said shaft having a diameter such that the ring cannot be spread sufficiently to pass said diameter without danger of breakage or permanent distortion, said shaft having an axially extending slot therethrough providing a reduced portion comprising sections of which each will separately pass the ring without undue spreading to enable the ring to be brought into a position of complete encirclement of the shaft.

BEST PRATT.
CLARENCE J. SMITH.